US012682028B2

(12) United States Patent
Liu

(10) Patent No.: US 12,682,028 B2
(45) Date of Patent: Jul. 14, 2026

(54) BEHAVIOR WALLPAPER UNLOCKING METHOD AND ELECTRONIC DEVICE

(71) Applicant: VIVO MOBILE COMMUNICATION CO., LTD., Dongguan (CN)

(72) Inventor: Zhaohui Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 193 days.

(21) Appl. No.: 18/613,615

(22) Filed: Mar. 22, 2024

(65) Prior Publication Data

US 2024/0256303 A1 Aug. 1, 2024

Related U.S. Application Data

(63) Continuation of application No. PCT/CN2022/121016, filed on Sep. 23, 2022.

(30) Foreign Application Priority Data

Sep. 24, 2021 (CN) ........................... 202111123743.4

(51) Int. Cl.
*G06F 9/451* (2018.01)
*G06F 3/14* (2006.01)
*G06T 11/60* (2026.01)

(52) U.S. Cl.
CPC ............ *G06F 9/451* (2018.02); *G06F 3/1454* (2013.01); *G06T 11/60* (2013.01)

(58) Field of Classification Search
CPC ...................................................... G06F 9/451
See application file for complete search history.

(56) References Cited

U.S. PATENT DOCUMENTS

2011/0119610 A1* 5/2011 Hackborn ............. G06F 3/0488
715/764
2016/0301740 A1* 10/2016 Wu ....................... G06Q 10/103

FOREIGN PATENT DOCUMENTS

| CN | 106681769 A | 5/2017 |
| CN | 112148410 A | 12/2020 |
| CN | 112148415 A | 12/2020 |
| CN | 113805703 A | 12/2021 |

\* cited by examiner

*Primary Examiner* — Shivang I Patel
(74) *Attorney, Agent, or Firm* — The Webb Law Firm

(57) ABSTRACT

A behavior wallpaper unlocking method includes sending a first message to at least one second electronic device, where the first message is used to request the at least one second electronic device to unlock a target behavior wallpaper, the first message includes K task items, and each task item is corresponding to a part of wallpaper in the target behavior wallpaper; unlocking the target behavior wallpaper based on K target results sent by M second electronic devices; and applying the target behavior wallpaper to the first electronic device, where the M second electronic devices are devices in the at least one second electronic device, each target result is a result of one task item executed by one second electronic device in the M second electronic devices, K and M are positive integers, and M is less than or equal to K.

20 Claims, 3 Drawing Sheets

| A first electronic device sends a first message to at least one second electronic device | 201 |
| The first electronic device unlocks a target behavior wallpaper based on K target results sent by M second electronic devices, and applies the target behavior wallpaper to the first electronic device | 202 |

| A first electronic device sends a first message to at least one second electronic device | 201 |

| The first electronic device unlocks a target behavior wallpaper based on K target results sent by M second electronic devices, and applies the target behavior wallpaper to the first electronic device | 202 |

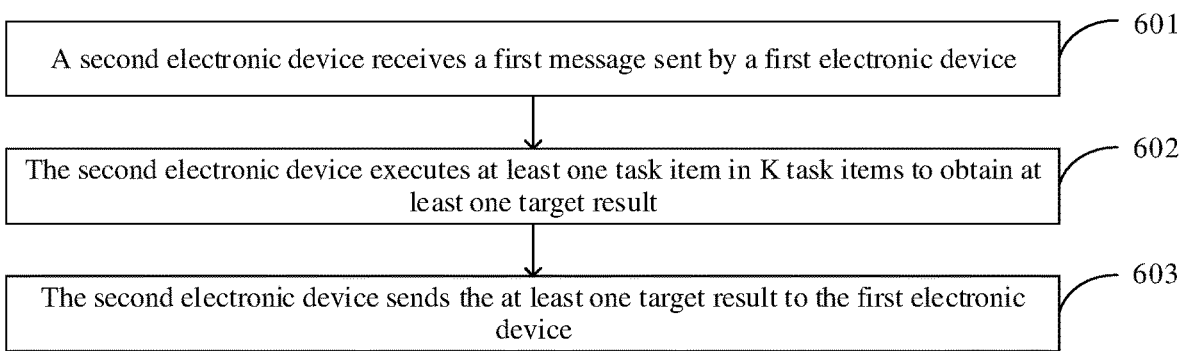

601 — A second electronic device receives a first message sent by a first electronic device 602 — The second electronic device executes at least one task item in K task items to obtain at least one target result 603 — The second electronic device sends the at least one target result to the first electronic device

FIG. 3

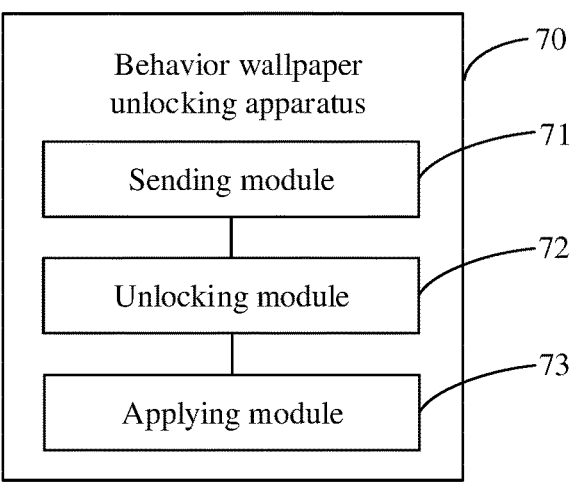

70 — Behavior wallpaper unlocking apparatus

71 — Sending module

72 — Unlocking module

73 — Applying module

FIG. 4

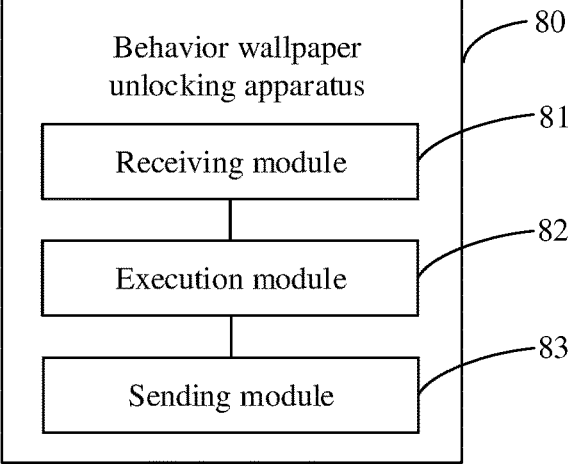

80 — Behavior wallpaper unlocking apparatus

81 — Receiving module

82 — Execution module

83 — Sending module

FIG. 5

BEHAVIOR WALLPAPER UNLOCKING METHOD AND ELECTRONIC DEVICE

CROSS-REFERENCE TO RELATED APPLICATIONS

This application is a Bypass Continuation Application of International Patent Application No. PCT/CN2022/121016, filed Sep. 23, 2022, and claims priority to Chinese Patent Application No. 202111123743.4, filed Sep. 24, 2021, the disclosures of which are hereby incorporated by reference in their entireties.

BACKGROUND OF THE INVENTION

Field of the Invention

This application pertains to the field of communications technologies, and in particular, to a behavior wallpaper unlocking method and an electronic device.

Description of Related Art

A behavior wallpaper may be understood as that a wallpaper changes with a change in a user's behavior. Generally, in a process in which the user uses the behavior wallpaper by using an electronic device, a task item may be set for the behavior wallpaper. Different phases of the task item are corresponding to different display effects of the behavior wallpaper. The user may unlock the behavior wallpaper by executing the task item. For example, the behavior wallpaper is a dynamic image of flower blooming, and the task item is a target quantity of steps per day. Each step the user walks, a flower on the behavior wallpaper slightly blooms. After the user completes the target quantity of steps per day, the flower completely blooms, that is, the behavior wallpaper is unlocked.

SUMMARY OF THE INVENTION

According to a first aspect, an embodiment of this application provides a behavior wallpaper unlocking method, applied to a first electronic device. The behavior wallpaper unlocking method includes: sending a first message to at least one second electronic device, where the first message is used to request the at least one second electronic device to unlock a target behavior wallpaper, the first message includes K task items, and each task item is corresponding to a part of wallpaper in the target behavior wallpaper; and unlocking the target behavior wallpaper based on K target results sent by M second electronic devices, and applying the target behavior wallpaper to the first electronic device, where the M second electronic devices are devices in the at least one second electronic device, each target result is a result of one task item executed by one second electronic device in the M second electronic devices, K and M are positive integers, and M is less than or equal to K.

According to a second aspect, an embodiment of this application provides a behavior wallpaper unlocking method, applied to a second electronic device. The behavior wallpaper unlocking method includes: receiving a first message sent by a first electronic device, where the first message is used to request the second electronic device to unlock a target behavior wallpaper, the first message includes K task items, and each task item is corresponding to a part of wallpaper in the target behavior wallpaper; executing at least one task item in the K task items to obtain at least one target result, where each target result is a result of one task item executed by the second electronic device; and sending the at least one target result to the first electronic device, where the at least one target result is used by the first electronic device to unlock the target behavior wallpaper.

According to a third aspect, an embodiment of this application provides a behavior wallpaper unlocking apparatus, and the behavior wallpaper unlocking apparatus includes a sending module, an unlocking module, and an applying module. The sending module is configured to send a first message to at least one second electronic device, where the first message is used to request the at least one second electronic device to unlock a target behavior wallpaper, the first message includes K task items, and each task item is corresponding to a part of wallpaper in the target behavior wallpaper. The unlocking module is configured to unlock the target behavior wallpaper based on K target results sent by M second electronic devices, where the M second electronic devices are devices in the at least one second electronic device, each target result is a result of one task item executed by one second electronic device in the M second electronic devices, K and M are positive integers, and M is less than or equal to K. The applying module is configured to apply, to a first electronic device, the target behavior wallpaper obtained by the unlocking module According to a fourth aspect, an embodiment of this application provides a behavior wallpaper unlocking apparatus, and the behavior wallpaper unlocking apparatus includes a receiving module, an execution module, and a sending module. The receiving module is configured to receive a first message sent by a first electronic device, where the first message is used to request a second electronic device to unlock a target behavior wallpaper, the first message includes K task items, and each task item is corresponding to a part of wallpaper in the target behavior wallpaper. The execution module is configured to execute at least one task item in the K task items to obtain at least one target result, where each target result is a result of one task item executed by the second electronic device. The sending module is configured to send, to the first electronic device, the at least one target result obtained by the execution module, where the at least one target result is used by the first electronic device to unlock the target behavior wallpaper.

According to a fifth aspect, an embodiment of this application further provides a communications device. The communications device includes a processor, a memory, and a program or an instruction stored in the memory and executable on the processor, and when the program or the instruction is executed by the processor, steps of the method according to the first aspect are implemented, or steps of the method according to the second aspect are implemented.

According to a sixth aspect, an embodiment of this application provides a non-transitory readable storage medium. The non-transitory readable storage medium stores a program or an instruction, and when the program or the instruction is executed by a processor, steps of the method according to the first aspect are implemented, or steps of the method according to the second aspect are implemented.

According to a seventh aspect, an embodiment of this application provides a chip. The chip includes a processor and a communications interface, the communications interface is coupled to the processor, and the processor is configured to run a program or an instruction, to implement the method according to the first aspect or the method according to the second aspect.

BRIEF DESCRIPTION OF THE DRAWINGS

FIG. 3 is a second flowchart of a behavior wallpaper unlocking method according to an embodiment of this application;

FIG. 4 is a first schematic diagram of a structure of a behavior wallpaper unlocking apparatus according to an embodiment of this application;

FIG. 5 is a second schematic diagram of a structure of a behavior wallpaper unlocking apparatus according to an embodiment of this application;

DESCRIPTION OF THE INVENTION

Figure 1:
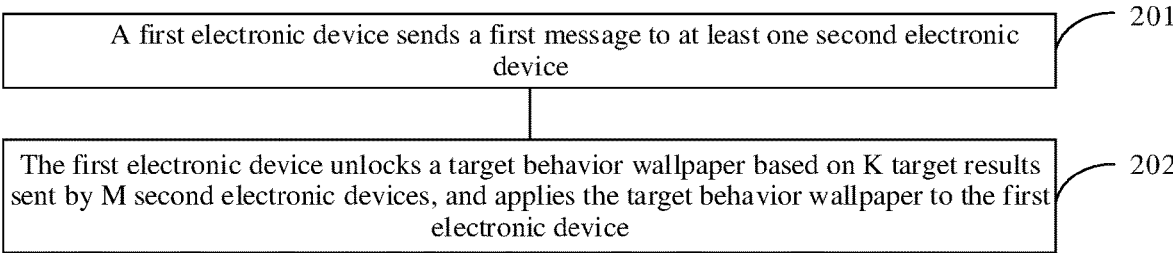
FIG. 1 is a first flowchart of a behavior wallpaper unlocking method according to an embodiment of this application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and a quantity of objects is not limited. For example, there may be one or more first objects. In addition, in this specification and the claims, "and/or" represents at least one of connected objects, and a character "/" generally represents an "or" relationship between associated objects.

A behavior wallpaper unlocking method provided in embodiments of this application will be described in detail below by using embodiments and application scenarios with reference to the accompanying drawings.

Currently, a behavior wallpaper encourages, in a novel and healthy manner, people to do sports, and a wonderful visual picture is a source for users to walk. The behavior wallpaper may be understood as that a wallpaper changes with a user's behavior. Generally, in a process in which the user uses the behavior wallpaper by using an electronic device, a task item may be set for the behavior wallpaper. Different phases of the task item are corresponding to different display effects of the behavior wallpaper. The user may unlock the behavior wallpaper by executing the task item. For example, the behavior wallpaper is a dynamic image of flower blooming, and a task item is a target quantity of steps per day. Each step of the user walks, a flower on the behavior wallpaper slightly blooms. After the user completes the target quantity of steps per day, the flower completely blooms, that is, the behavior wallpaper is unlocked.

However, in the foregoing process, on one hand, the behavior wallpaper is used only for a user to whom the electronic device belongs, and the unlocked behavior wallpaper cannot be shared with another user, that is, another user cannot participate in the foregoing process or view a final effect of the behavior wallpaper, and therefore, interaction and interest of using the behavior wallpaper by the user are poor. On the other hand, because only a single user participates in a process of unlocking the behavior wallpaper, a period of unlocking the behavior wallpaper is relatively long. Consequently, efficiency and flexibility of unlocking the behavior wallpaper by using the electronic device are relatively low.

In embodiments of this application, in a process in which a user uses a behavior wallpaper by using a first electronic device, if the user wants to unlock one behavior wallpaper (that is, a target behavior wallpaper in the following embodiment) of the first electronic device together with another user, the user may send a message (that is, a first message in the following embodiment) to a plurality of second electronic devices by using the first electronic device, to request the plurality of second electronic devices to unlock the behavior wallpaper. Because the first message includes K task items, and each task item is corresponding to a part of wallpaper in the behavior wallpaper, each second electronic device in the plurality of second electronic devices may separately execute one or more task items, and send a result of each task item to the first electronic device, so that the first electronic device unlocks the behavior wallpaper based on the results and applies the target behavior wallpaper to the first electronic device. Therefore, a plurality of users can jointly unlock the behavior wallpaper.

In this solution, on one hand, the first electronic device may send a request to at least one second electronic device, so that a user of the first electronic device can unlock the target behavior wallpaper in the first electronic device together with another user. In addition, after the target behavior wallpaper is unlocked, the user may further share the target behavior wallpaper with another user by using the first electronic device, so that the user of the first electronic device shares a same behavior wallpaper with another user, thereby increasing interactivity, the sense of accompany, and interest of using the behavior wallpaper by the user by the user. On the other hand, because a plurality of users jointly participate in a process of unlocking the target behavior wallpaper, the first electronic device may quickly unlock the target behavior wallpaper based on one or more results sent by each second electronic device, thereby shortening time of unlocking the target behavior wallpaper by the first electronic device, and avoiding a problem that a period of unlocking the target behavior wallpaper by a single electronic device is relatively long. In this way, efficiency and flexibility of unlocking the target behavior wallpaper by the electronic device are improved.

Embodiment 1

An embodiment of this application provides a behavior wallpaper unlocking method. FIG. 1 is a flowchart of a behavior wallpaper unlocking method according to an embodiment of this application. The method may be applied to a first electronic device. As shown in FIG. 1, the behavior wallpaper unlocking method provided in this embodiment of this application may include the following step 201 and step 202.

Step 201: The first electronic device sends a first message to at least one second electronic device.

In this embodiment of this application, the first message is used to request the at least one second electronic device to unlock a target behavior wallpaper, the first message includes K task items, each task item is corresponding to a part of wallpaper in the target behavior wallpaper, and K is a positive integer.

In this embodiment of this application, in a process in which a user uses the behavior wallpaper by using the first electronic device, if the user wants to unlock one behavior wallpaper (that is, the target behavior wallpaper) in the first electronic device together with another user, the user may send a message (that is, the first message) to a plurality of second electronic devices by using the first electronic device, to request the plurality of second electronic devices to unlock the behavior wallpaper. Because the first message includes K task items and each task item is corresponding to a part of wallpaper in the behavior wallpaper, each second electronic device in the plurality of second electronic devices may separately execute one or more task items, and send a result of each task item to the first electronic device, so that the first electronic device may unlock the behavior wallpaper based on the results and apply the target behavior wallpaper to the first electronic device. Therefore, a plurality of users can jointly unlock the behavior wallpaper.

Optionally, in this embodiment of this application, before the first electronic device sends the first message to the at least one second electronic device, the first electronic device may establish an association relationship with the second electronic device. The association relationship includes but is not limited to: the first electronic device has a contact manner (for example, a phone number) of a user of the electronic device, the user of the second electronic device is a friend of a user of the first electronic device on a specific social platform (for example, a chat application), and the user of the second electronic device is a friend of the user of the first electronic device in a theme application. This may be determined according to an actual use requirement, and is not limited in this embodiment of this application.

It should be noted that the theme application may be an application for setting the target behavior wallpaper.

Optionally, in this embodiment of this application, in an implementation, the user may send the first message to the second electronic device by using contact manners of some users in the first electronic device. In another implementation, the user may send the first message to the second electronic device by using a social platform in the first electronic device. In still another implementation, the user may send the first message to the second electronic device by using a theme application in the first electronic device.

It may be understood that the user may use an association relationship to publish an invitation to unlock the target behavior wallpaper to a plurality of second electronic devices by using the first electronic device, to shorten time of unlocking the target behavior wallpaper and increase the sense of interaction in a process of unlocking the target behavior wallpaper.

Optionally, in this embodiment of this application, the at least one second electronic device may be one second electronic device or a plurality of second electronic devices.

Optionally, in this embodiment of this application, the target behavior wallpaper is any behavior wallpaper in a plurality of behavior wallpapers in the electronic device.

Optionally, in this embodiment of this application, the target behavior wallpaper may be the following three forms of behavior wallpaper. In a first implementation, the target behavior wallpaper includes a wallpaper with at least two faces or wallpaper with at least two dimensions. Each time one task item is completed, one side or dimension is unlocked, and any single side or dimension is planar, and only after all faces or dimensions are unlocked, all the faces or dimensions are combined to form a complete dynamic polyhedron. It is assumed that the target behavior wallpaper is a cube, and only one side can be unlocked each time. After all faces are unlocked, a complete cube is formed. In a second implementation, the target behavior wallpaper includes at least two task objects or at least two task nodes. Each time one task item is unlocked, one object or node is unlocked. Only after all objects or nodes are unlocked, all the objects or nodes form a complete system. It is assumed that the target behavior wallpaper is a running prompt of eight planets, and only one planet can be unlocked each time. After all the planets are unlocked, a complete planetary running system is synthesized. In a third implementation, the target behavior wallpaper includes at least two parts of wallpaper. Each time one task item is completed, a part of the wallpaper is unlocked. Only after all parts of wallpaper are unlocked, all the parts of wallpaper form a complete behavior wallpaper. It is assumed that the target behavior wallpaper is a couple wallpaper, a parent-child wallpaper, or the like. Each time only a part of the wallpaper can be unlocked, and after all parts are unlocked, a complete couple wallpaper or a parent-child wallpaper is formed.

It should be noted that the foregoing target behavior wallpaper is merely an example, that is, this embodiment of this application includes but is not limited to the foregoing listed types of target behavior wallpaper. In actual implementation, the target behavior wallpaper may alternatively be a behavior wallpaper in any other possible form, and may be determined according to an actual use requirement. This is not limited in this embodiment of this application.

Optionally, in this embodiment, the K task items and a correspondence between each task item and the target behavior wallpaper may be preset by the user, or may be default by the electronic device. This may be determined according to an actual use requirement, and is not limited in this embodiment of this application.

Optionally, in this embodiment of this application, the K task items may include a task item to be executed by the first electronic device and a task item to be executed by the at least one second electronic device, or the K task items may include only a task item to be executed by the at least one second electronic device.

Optionally, in this embodiment of this application, a quantity of the at least one second electronic device may be greater than a quantity of the K task items.

Optionally, in this embodiment of this application, the foregoing first message further includes at least one of the following: deadline time of each task item in the K task items, a preview effect of the target behavior wallpaper, or indication information, and the indication information is used to indicate related content of the target behavior wallpaper to be sent by the first electronic device after the target behavior wallpaper is unlocked.

Optionally, in this embodiment of this application, the cutoff time of each task item may be preset by the user, or may be default by the electronic device. This may be determined according to an actual use requirement, and is not limited in this embodiment of this application.

It may be understood that the user may assemble, by using the first message, a person who participates in unlocking the target behavior wallpaper. If users who executes a specific task are not assembled when the task item reaches deadline time, the task item automatically expires. In addition, in a case that the task item is not completed before the task item reaches deadline time, the target behavior wallpaper fails to be unlocked.

Optionally, in this embodiment of this application, the preview effect of the target behavior wallpaper may be a preview effect of unlocking a part of the target behavior wallpaper, or an overall preview effect of the target behavior wallpaper after the entire target behavior wallpaper is unlocked, that is, a final effect of the target behavior wallpaper.

Optionally, in this embodiment of this application, the indication information may be used to indicate related content of the target behavior wallpaper that may be obtained by the second electronic device after the target behavior wallpaper is unlocked, for example, instruct the second electronic device to obtain the target behavior wallpaper.

Step 202: The first electronic device unlocks the target behavior wallpaper based on K target results sent by M second electronic devices, and applies the target behavior wallpaper to the first electronic device.

In this embodiment of this application, the M second electronic devices are devices in the at least one second electronic device, each target result is a result of one task item executed by one second electronic device in the M second electronic devices, M is a positive integer, and M is less than or equal to K.

Optionally, in this embodiment of this application, the M second electronic devices are some or all of the at least one second electronic device.

It should be noted that, because some of the at least one second electronic device may not participate in a process of unlocking the target behavior wallpaper, that is, does not execute the task item, the M second electronic devices are some of the at least one second electronic device. If each electronic device in the at least one second electronic device participates in the process of unlocking the target behavior wallpaper, the M second electronic devices are all devices in the at least one second electronic device.

Optionally, in this embodiment of this application, each second electronic device may execute one or more task items in the K task items.

Optionally, in this embodiment of this application, M may be less than K, or M may be equal to K. In an implementation, in a case that each of the M second electronic devices executes one task item, each second electronic device sends one target result to the first electronic device, that is, the M second electronic devices send M target results to the first electronic device. In another implementation, in a case that some electronic devices in the M second electronic devices execute one task item, and the other electronic devices execute a plurality of task items, each second electronic device in the some electronic devices sends one target result to the first electronic device, and each second electronic device in the other electronic devices sends a plurality of target results to the first electronic device, that is, the M second electronic devices send K target results to the first electronic device, and M is less than K. In still another implementation, in a case that each electronic device in the M second electronic devices executes a plurality of task items, each second electronic device sends a plurality of target results to the first electronic device, that is, the M second electronic devices send K target results to the first electronic device, and M is less than K.

Optionally, in this embodiment of this application, after the target behavior wallpaper is unlocked, the first electronic device may automatically send the target behavior wallpaper to the M second electronic devices; or the user triggers, by using an input, the first electronic device to send the target behavior wallpaper to the M second electronic devices.

Optionally, in this embodiment of this application, applying the target behavior wallpaper to the first electronic device may be: updating a wallpaper in the first electronic device to the target behavior wallpaper.

Figure 2:
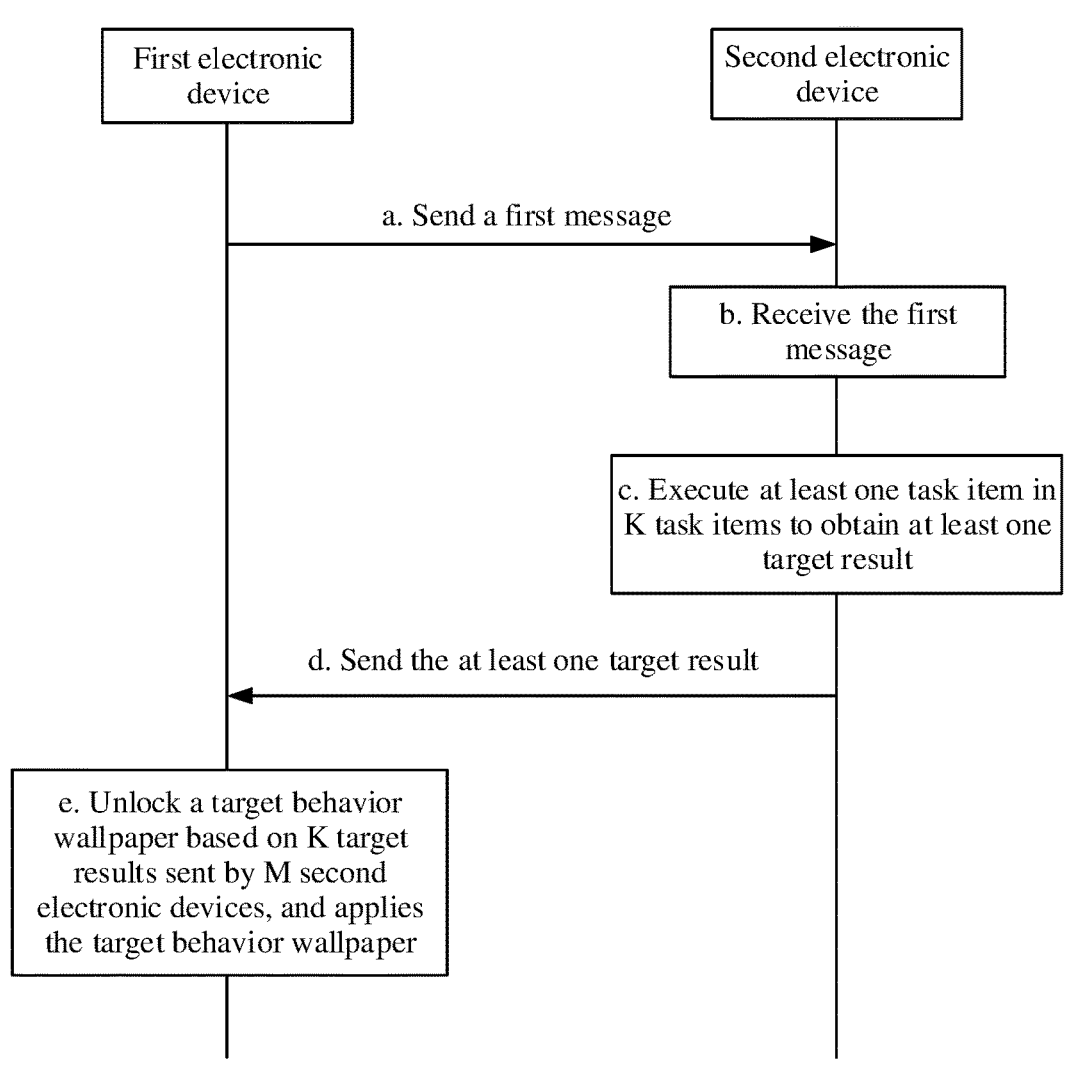
FIG. 2 is a schematic interaction diagram of a behavior wallpaper unlocking method according to an embodiment of this application.

For the foregoing method in step 201 and step 202, FIG. 2 is a schematic interaction diagram of a behavior wallpaper unlocking method according to an embodiment of this application. With reference to FIG. 2, the behavior wallpaper unlocking method provided in this embodiment of this application is described below.

Step a: A first electronic device sends a first message to at least one second electronic device.

The first message is used to request the at least one second electronic device to unlock a target behavior wallpaper in the first electronic device, the first message includes K task items, and each task item is corresponding to a part of wallpaper in the target behavior wallpaper.

Step b: The second electrical device receives the first message sent by the first electronic device.

Step c: The second electronic device executes at least one task item in the K task items to obtain at least one target result.

Step d: The second electronic device sends the at least one target result to the first electronic device.

Step e: The first electronic device unlocks the target behavior wallpaper based on K target results sent by the M second electronic devices, and applies the target behavior wallpaper to the first electronic device.

The M second electronic devices are devices in the at least one second electronic device, each target result is a result of one task item executed by one second electronic device in the M second electronic devices, K and M are positive integers, and M is less than or equal to K.

This embodiment of this application provides a behavior wallpaper unlocking method. In a process of using a behavior wallpaper by a user by using the first electronic device, the first message may be sent to a plurality of second electronic devices (that is, the at least one second electronic device), to request the plurality of second electronic devices to unlock the target behavior wallpaper. Because the first message includes K task items and each task item is corresponding to a part of wallpaper in the behavior wallpaper, each second electronic device in the multiple second electronic devices may separately execute one or more task items, and send a result of each task item to the first electronic device, so that the first electronic device unlocks the target behavior wallpaper based on these results, and applies the target behavior wallpaper to the first electronic device. In this solution, on one hand, the first electronic device may send a request to the at least one second electronic device, so that a user of the first electronic device may unlock the target behavior wallpaper in the first electronic device together with another user, thereby increasing interaction, the sense of accompany, and interest of using the behavior wallpaper by the user. On the other hand, because a plurality of users jointly participate in a process of unlocking the target behavior wallpaper, the first electronic device may quickly unlock the target behavior wallpaper based on one or more target results sent by each second electronic device, thereby shortening time of unlocking the target behavior wallpaper by the first electronic device, and avoiding a problem that a period of unlocking the target behavior wallpaper by a single electronic device is relatively long. In this way, efficiency and flexibility of unlocking the target behavior wallpaper by the electronic device are improved.

Optionally, in this embodiment of this application, before step 202, the behavior wallpaper unlocking method provided in this embodiment of this application further includes the following step 301 and step 302.

Step 301: The first electronic device receives at least one second message sent by the at least one second electronic device.

In this embodiment of this application, each second message is used to indicate a to-be-executed task item selected by one of the at least one second electronic device.

It may be understood that, because the first message includes K task items, each second electronic device may select at least one task item from the K task items, and send a message (that is, a second message) to the first electronic device, to indicate a to-be-executed task item selected by the second electronic device.

Optionally, in this embodiment of this application, to-be-executed task items selected by the second electronic devices in the at least one second electronic device may be the same or different.

Step 302: In a case that all N second messages in the at least one second message indicate a first task item, the first electronic device sends a third message to N second electronic devices corresponding to the N second messages.

In this embodiment of this application, the third message is used to indicate that a target electronic device in the N second electronic devices is allowed to execute the first task item. The target electronic device is a device corresponding to a message that is in the N second messages and that is received at the earliest time, and N is an integer greater than 1; or the target electronic device is a device corresponding to a message selected from the N second messages by a user to whom the first electronic device belongs. The K second electronic devices include another electronic device and the target electronic device, and the another electronic device is a device in the at least one second electronic device other than the N second electronic devices.

In this embodiment of this application, in a case that all the N second electronic devices select the first task item, in an implementation, the first electronic device may determine, by using a "first come, first served" principle, an electronic device that is allowed to execute the first task item. In other words, a second electronic device sends a third message that indicates the first task item and that is first received by the first electronic device is allowed to execute the first task item. In another manner, the user may input a message in the N second messages, to allow the electronic device corresponding to the message to execute the first task item.

Optionally, in this embodiment of this application, the device corresponding to the message that is in the N second messages and that is received at the earliest time may be understood as a second electronic device that is the first one to the second message.

Optionally, in this embodiment of this application, after the first electronic device sends the third message to the N second electronic devices, an electronic device other than the target electronic device in the N second electronic devices may re-select a to-be-executed task item.

In this embodiment of this application, in a case that a plurality of second electronic devices select a specific task item, the first electronic device may determine, by using a "first come, first served" principle, an electronic device that is allowed to execute the task item, or the user may execute an input to select an electronic device that is allowed to execute the task item, to ensure that each task item is executed by one second electronic device. In this way, each second electronic device executes a different task item, so that the first electronic device unlocks different parts of wallpaper in the target behavior wallpaper based on different target results, thereby improving efficiency of unlocking the target behavior wallpaper by the electronic device.

Optionally, in this embodiment of this application, a quantity of the at least one second electronic device is greater than a quantity of the K task items. Optionally, after step 202, the behavior wallpaper unlocking method provided in this embodiment of this application may further include the following step 401 and step 402.

Step 401: The first electronic device receives at least one fourth message sent by the at least one second electronic device.

In this embodiment of this application, each fourth message is used to indicate a to-be-executed task item selected by one of the at least one second electronic device.

It may be understood that, because the first message includes the K task items, each second electronic device may select at least one task item from the K task items, and send a message (that is, the fourth message) to the first electronic device, to indicate a to-be-executed task item selected by the second electronic device.

Step 402: The first electronic device separately sends a fifth message to M second electronic devices in the at least one second electronic device.

In this embodiment of this application, the fifth message is used to indicate that P second electronic devices are allowed to execute selected task items, where the P second electronic devices are devices corresponding to first P received messages in at least one fourth message, and P is a positive integer. The M second electronic devices are the P second electronic devices.

In this embodiment of this application, in a case that the quantity of the at least one second electronic device is greater than the quantity of the K task items, the first electronic device may determine, by using a "first come, first served" principle, an electronic device corresponding to each task item. In other words, the first electronic device may allow the second electronic device to execute the selected task item in a time sequence of receiving the fifth message, until all the task items are selected.

It may be understood that a set of task items selected by the P second electronic devices is the K task items.

Optionally, in this embodiment of this application, a task item selected by each of the P second electronic devices is different.

Optionally, in this embodiment of this application, after the first electronic device sends the fifth message to the P second electronic devices, a first message received by an electronic device other than the P electronic devices in the at least one second electronic device automatically fails. It may be understood that after all the task items are selected, the second electronic device that does not select the task item cannot participate in the process of unlocking the target behavior wallpaper.

In this embodiment of this application, because the user of the first electronic device sends more invitation objects than the K task items, the first electronic device may adopt a "first come, first served" principle, and allow a second electronic device that first selects a task item to execute each selected task item until all the task items are selected, to ensure that each task item is corresponding to one second electronic device. In this way, the first electronic device may unlock a part of wallpaper in the target behavior wallpaper based on a target result of each task item, thereby improving efficiency of unlocking the target behavior wallpaper by the electronic device.

Optionally, in this embodiment of this application, step 202 may be implemented by using step 202*a* and step 202*b*.

Step 202*a*: Unlock, for a target result sent by each second electronic device in the M second electronic devices, a part of wallpaper corresponding to the target task item in the target behavior wallpaper.

In this embodiment of this application, the target task item is a task item corresponding to a target result sent by one second electronic device in the M second electronic devices.

Optionally, in this embodiment of this application, a target result sent by each second electronic device may be corresponding to one or more task items. In an implementation, in a case that one second electronic device selects one task item, a target result sent by one second electronic device is a result of executing the task item by the second electronic device. In another implementation, in a case that one second electronic device selects a plurality of task items, a target result sent by one second electronic device is a result of executing the plurality of task items by the second electronic device.

Optionally, in this embodiment of this application, because one task item is corresponding to a part of wallpaper in the target behavior wallpaper, in a case that the target task item is one task item, the first electronic device may unlock a part of wallpaper corresponding to the task item, and in a case that the target task item is a plurality of task items, the first electronic device may unlock a part of wallpaper corresponding to each task item in the plurality of task items, to unlock a plurality of parts of wallpaper.

Optionally, in this embodiment of this application, each time the second electronic device completes one task item, the first electronic device unlocks a part of wallpaper in the target behavior wallpaper.

It should be noted that, in step 202*a*, unlocking the target behavior wallpaper is described by using one second electronic device as an example. For each second electronic device in the M second electronic devices, a method in step 202*a* may be used to unlock the target behavior wallpaper. It may be understood that each second electronic device in the M second electronic devices unlocks at least a part of wallpaper in the target behavior wallpaper.

Step 202*b*: After unlocking all parts of wallpaper corresponding to the K target results, the first electronic device synthesizes all parts of wallpaper to obtain the target behavior wallpaper.

In this embodiment of this application, after unlocking all parts of wallpaper, the first electronic device may automatically synthesize all parts of wallpaper into a complete behavior wallpaper. In this way, a plurality of users jointly unlock the target behavior wallpaper in the first electronic device, so that interaction, the sense of accompany, and interest of using the behavior wallpaper by the user are increased. In addition, time of unlocking the target behavior wallpaper by the first electronic device is shortened, and a problem that a period of unlocking the target behavior wallpaper by a single electronic device is relatively long is avoided, thereby improving efficiency and flexibility of unlocking the target behavior wallpaper by the electronic device.

Optionally, in this embodiment of this application, before step 202, the behavior wallpaper unlocking method provided in this embodiment of this application further includes the following step 501 to step 504.

Step 501: The first electronic device receives a first input by the user for the target behavior wallpaper.

Optionally, in this embodiment of this application, the first input may be an input in any possible form, such as a tap input, a touch and hold input, or a sliding input. This may be determined according to an actual use requirement, and is not limited in this embodiment of this application.

Optionally, in this embodiment of this application, a wallpaper donating function is added to a theme application in the first electronic device, so that the unlocked behavior wallpaper may be packaged into an online wallpaper and donated to another user.

Step 502: The first electronic device displays at least one device identifier in response to the first input.

In this embodiment of this application, each device identifier indicates one second electronic device in the at least one second electronic device.

Optionally, in this embodiment of this application, the first electronic device may cancel displaying of the target behavior wallpaper, and display the at least one device identifier or the first electronic device may overlay the at least one device identifier on the target behavior wallpaper.

Optionally, in this embodiment of this application, for each device identifier in the at least one device identifier, one device identifier may be a name, a profile picture, or the like of one second electronic device.

Step 503: The first electronic device receives a second input by the user.

In this embodiment of this application, the second input is an input by the user for a target device identifier in the at least one device identifier.

Optionally, in this embodiment of this application, the second input may be an input in any possible form, such as a tap input, a touch and hold input, or a sliding input. This may be determined according to an actual use requirement, and is not limited in this embodiment of this application.

Step 504: The first electronic device sends, in response to the second input, the target behavior wallpaper to a second electronic device indicated by a target device identifier.

Optionally, in this embodiment of this application, the second electronic device indicated by the target device identifier may be a second electronic device in the K second electronic devices. It may be understood that the user may donate the target behavior wallpaper to another user that executes the task item, so that a task executor and a task initiator enjoy a same behavior wallpaper.

In this embodiment of this application, after the first electronic device unlocks the target behavior wallpaper, the user may choose to donate the target behavior wallpaper to another user, so that the another user can also enjoy the same behavior wallpaper with the user, thereby increasing interaction, the sense of accompany, and interest in using the behavior wallpaper by the user, thereby improving flexibility of unlocking the target behavior wallpaper by the electronic device.

Optionally, in this embodiment of this application, after step 202, the behavior wallpaper unlocking method provided in this embodiment of this application may further include the following step 203.

Step 203: In a case of determining current system time is specific time and the target behavior wallpaper is a specific type of wallpaper, the first electronic device sends the target behavior wallpaper to a target user.

In this embodiment of this application, the target user is a user associated with the user to whom the first electronic device belongs.

Optionally, in this embodiment of this application, the current system time may be time displayed on the electronic device.

Optionally, in this embodiment of this application, the specific time may be preset by the user, or may be default by the electronic device. For example, the specific time may be a special festival, such as Valentine's Day, birthday, and anniversary.

Optionally, in this embodiment of this application, the specific type of wallpaper may be a behavior wallpaper with a special meaning, for example, rose.

Optionally, in this embodiment of this application, the user to whom the first electronic device belongs may establish an association relationship with the target user in advance. It should be noted that for a method used by the user to whom the first electronic device belongs establishes the association relationship with the target user, refer to related descriptions of step 201 in the foregoing embodiment. Details are not described herein again.

Optionally, in this embodiment of this application, the first electronic device may obtain a person relationship between the user to whom the first electronic device belongs and the target user, to send the specific type of behavior wallpaper to the target user at the specific time. For example, a user A (that is, the user to whom the first electronic device belongs) and a user B (that is, the target user) are in lovers or a couple. In a specific day (such as Valentine's Day, anniversary, or birthday), if the user A wants to create a surprise for the user B, the user A may unlock a behavior wallpaper (such as rose) with a specific meaning in advance, so that the first electronic device sends the rose wallpaper to the user B on the Valentine's Day.

In this embodiment of this application, the first electronic device may send the specific type of behavior wallpaper to a specific user at specific time. This creates a surprise for the specific user, increases interaction and interest of the behavior wallpaper, improves flexibility of using the behavior wallpaper by the electronic device, and improves user experience.

Embodiment 2

An embodiment of this application provide a behavior wallpaper unlocking method. FIG. 3 is a flowchart of another behavior wallpaper unlocking method according to an embodiment of this application. The method may be applied to a second electronic device. As shown in FIG. 3, the behavior wallpaper unlocking method provided in this embodiment of this application may include the following step 601 to step 603.

Step 601: A second electronic device receives a first message sent by a first electronic device.

In this embodiment of this application, the first message is used to request the second electronic device to unlock a target behavior wallpaper, the first message includes K task items, and each task item is corresponding to a part of wallpaper in the target behavior wallpaper.

It should be noted that for descriptions of the first message, the target behavior wallpaper, and the like in step 601, reference may be made to the descriptions in Embodiment 1, and details are not described herein again.

Step 602: The second electronic device executes at least one task item in the K task items to obtain at least one target result.

In this embodiment of this application, each target result is a result of one task item executed by the second electronic device.

It should be noted that for descriptions of the K task items, the target result, and the like in step 602, reference may be made to the descriptions in Embodiment 1, and details are not described herein again.

Step 603: The second electronic device sends the at least one target result to the first electronic device.

In this embodiment of this application, the at least one target result is used by the first electronic device to unlock the target behavior wallpaper.

It should be noted that for descriptions of the target result and the like in step 603, reference may be made to the descriptions in Embodiment 1, and details are not described herein again.

This embodiment of this application provides a behavior wallpaper unlocking method. The second electronic device may receive the first message sent by the first electronic device. Because the first message includes K task items and each task item is corresponding to a part of wallpaper in the behavior wallpaper, the second electronic device may execute one or more task items in the K task items, and send, to the first electronic device, a target result obtained by executing the one or more task items, so that the first electronic device unlocks the target behavior wallpaper based on these target results. In this solution, on one hand, because a user of the first electronic device and a user of the second electronic device may jointly unlock the target behavior wallpaper in the first electronic device, interaction, the sense of accompany, and interest of using the behavior wallpaper by the user are increased. On the other hand, because a plurality of users jointly participate in a process of unlocking the target behavior wallpaper, the first electronic device may quickly unlock the target behavior wallpaper based on one or more target results sent by each second electronic device, thereby shortening time of unlocking the target behavior wallpaper by the first electronic device, and avoiding a problem that a period of unlocking the target behavior wallpaper by a single electronic device is relatively long. In this way, efficiency and flexibility of unlocking the target behavior wallpaper by the electronic device are improved.

Optionally, in this embodiment of this application, before step 602, the behavior wallpaper unlocking method provided in this embodiment of this application may further include the following step 701 and step 702.

Step 701: The second electronic device sends a second message to the first electronic device.

In this embodiment of this application, the second message is used to indicate a to-be-executed task item selected by the second electronic device.

It should be noted that for descriptions of the second message and the like in step 701, reference may be made to the descriptions in Embodiment 1, and details are not described herein again.

Step 702: The second electronic device receives a third message sent by the first electronic device.

In this embodiment of this application, the third message is sent by the first electronic device in a case that all N received second messages indicate a first task item. The third message is used to instruct the second electronic device to execute the first task item. The second electronic device is a device corresponding to a message that is in the N second messages and that is sent at the earliest time, and N is an integer greater than 1, or the second electronic device is a device corresponding to a message selected from the N second messages by a user to whom the first electronic device belongs.

It should be noted that for descriptions of the third message, the second electronic device, the first task item, and the like in step 702, reference may be made to the descriptions in Embodiment 1, and details are not described herein again.

In this embodiment of this application, in a case that a plurality of second electronic devices select a specific task item, the first electronic device may determine, by using a "first come, first served" principle, an electronic device that is allowed to execute the task item, or the user may execute an input to select an electronic device that is allowed to execute the task item, to ensure that each task item is executed by one second electronic device. In this way, each second electronic device executes a different task item, so that the first electronic device unlocks different parts of wallpaper in the target behavior wallpaper based on different target results, thereby improving efficiency of unlocking the target behavior wallpaper by the electronic device.

Optionally, in this embodiment of this application, a quantity of the at least one second electronic device is greater than a quantity of the K task items. Optionally, after step 602, the behavior wallpaper unlocking method provided in this embodiment of this application may further include the following step 801 and step 802.

Step 801: The second electronic device sends a fourth message to the first electronic device.

In this embodiment of this application, the fourth message is used to indicate a to-be-executed task item selected by the second electronic device.

It should be noted that for descriptions of the fourth message and the like in step 801, reference may be made to the descriptions in Embodiment 1, and details are not described herein again.

Step 802: The second electronic device receives a fifth message sent by the first electronic device.

In this embodiment of this application, the fifth message is used to indicate that the second electronic device is allowed to execute the selected task item. The second electronic device is a device corresponding to first P received messages in at least one fourth message received by the first electronic device, and P is a positive integer.

It should be noted that for descriptions of the fifth message, the second electronic device, and the like in step 802, reference may be made to the descriptions in Embodiment 1, and details are not described herein again.

In this embodiment of this application, because the user of the first electronic device sends more invitation objects than the K task items, the first electronic device may adopt a "first come, first served" principle, and allow a second electronic device that first selects a task item to execute each selected task item until all the task items are selected, to ensure that each task item is corresponding to one second electronic device. In this way, the first electronic device may unlock a part of wallpaper in the target behavior wallpaper based on a target result of each task item, thereby improving efficiency of unlocking the target behavior wallpaper by the electronic device Optionally, in this embodiment of this application, after step 603, the behavior wallpaper unlocking method provided in this embodiment of this application further includes the following step 901.

Step 901: The second electronic device receives a target behavior wallpaper sent by the first electronic device, and applies the target behavior wallpaper to the second electronic device.

Optionally, in this embodiment of this application, before the target behavior wallpaper is applied to the second electronic device, the second electronic device may download the target behavior wallpaper, perform validity check on the target behavior wallpaper, and apply the target behavior wallpaper to the second electronic device in a case that validity check on the target behavior wallpaper succeeds.

It should be noted that the foregoing validity check may be understood as: whether the second electronic device can support a format of the target behavior wallpaper. It may be understood that, in a case that the second electronic device supports the format of the target behavior wallpaper, the second electronic device may apply the target behavior wallpaper, and in a case that the second electronic device does not support the format of the target behavior wallpaper, the second electronic device cannot apply the target behavior wallpaper.

Optionally, in this embodiment of this application, that the second electronic device applies the target behavior wallpaper to the second electronic device may be updating a wallpaper in the second electronic device to the target behavior wallpaper.

In this embodiment of this application, after the first electronic device unlocks the target behavior wallpaper, the second electronic device may receive the target behavior wallpaper sent by the first electronic device. In this way, a user (that is, a task executor) of the second electronic device may enjoy a same behavior wallpaper as a user (that is, a task initiator) of the first electronic device, thereby increasing interaction, the sense of accompany, and interest in using the behavior wallpaper by the user, thereby improving flexibility of unlocking the target behavior wallpaper by the electronic device.

It should be noted that the behavior wallpaper unlocking method provided in this embodiment of this application may be performed by a behavior wallpaper unlocking apparatus, or a control module that is in the behavior wallpaper unlocking apparatus and that is used to perform the behavior wallpaper unlocking method. In this embodiment of this application, that the behavior wallpaper unlocking apparatus performs the behavior wallpaper unlocking method is used to describe the behavior wallpaper unlocking apparatus provided in embodiments of this application.

FIG. 4 is a schematic diagram of a possible structure of a behavior wallpaper unlocking apparatus according to an embodiment of this application. As shown in FIG. 4, the behavior wallpaper unlocking apparatus 70 may include a sending module 71, an unlocking module 72, and an applying module 73.

The sending module 71 is configured to send a first message to at least one second electronic device, where the first message is used to request the at least one second electronic device to unlock a target behavior wallpaper, the first message includes K task items, and each task item is corresponding to a part of wallpaper in the target behavior wallpaper. The unlocking module 72 is configured to unlock the target behavior wallpaper based on K target results sent by M second electronic devices, where the M second electronic devices are devices in the at least one second electronic device, each target result is a result of one task item executed by one second electronic device in the M second electronic devices, K and M are positive integers, and M is less than or equal to K. The applying module 73 is configured to apply the target behavior wallpaper to a first electronic device.

This embodiment of this application provides a behavior wallpaper unlocking apparatus. On one hand, a request may be sent to the at least one second electronic device, so that a user of the first electronic device can unlock the target behavior wallpaper in the first electronic device together with another user, thereby increasing interaction, the sense of accompany, and interest of using the behavior wallpaper by the user. On the other hand, because a plurality of users jointly participate in a process of unlocking the target behavior wallpaper, the target behavior wallpaper may be quickly unlocked based on one or more target results sent by each second electronic device, thereby shortening time of unlocking the target behavior wallpaper, and avoiding a problem that a period of unlocking the target behavior wallpaper by a single electronic device is relatively long. In this way, efficiency and flexibility of unlocking the target behavior wallpaper are improved.

In a possible implementation, the behavior wallpaper unlocking apparatus 70 further includes a receiving module. The receiving module is configured to: before the unlocking module 72 unlocks the target behavior wallpaper based on the K target results sent by the M second electronic devices, receive at least one second message sent by the at least one second electronic device, where each second message is used to indicate a to-be-executed task item selected by one second electronic device in the at least one second electronic device. The sending module 71 is further configured to: in a case that all N second messages in the at least one second message received by the receiving module indicate a first task item, send a third message to N second electronic devices corresponding to the N second messages, where the third message is used to indicate that a target electronic device in the N second electronic devices is allowed to execute the first task item, the target electronic device is a device corresponding to a message that is in the N second messages and that is received at the earliest time, and N is an integer greater than 1, or the target electronic device is a device corresponding to a message selected from the N second messages by a user to whom the first electronic device belongs. The M second electronic devices include another electronic device and the target electronic device, and the another electronic device is a device in the at least one second electronic device other than the N second electronic devices.

In a possible implementation, a quantity of the at least one second electronic device is greater than a quantity of the K task items. The behavior wallpaper unlocking apparatus 70 further includes a receiving module. The receiving module is configured to: before the unlocking module 72 unlocks the target behavior wallpaper based on the K target results sent by the M second electronic devices, receive at least one fourth message sent by the at least one second electronic device, where each fourth message is used to indicate a to-be-executed task item selected by one second electronic device in the at least one second electronic device. The sending module 71 is further configured to separately send a fifth message to P second electronic devices in the at least one second electronic device, where the fifth message is used to indicate that the P second electronic devices are allowed to execute selected task items, the P second electronic devices are devices corresponding to first M received messages in the at least one fourth message, and P is a positive integer. The M second electronic devices are the P second electronic devices.

In a possible implementation, the unlocking module 72 is configured to: unlock a part of wallpaper corresponding to a target task item in the target behavior wallpaper for a target result sent by each second electronic device in the M second electronic devices, where the target task item is a task item corresponding to a target result sent by one second electronic device in the M second electronic devices; and after all parts of wallpaper corresponding to the K target results are unlocked, synthesize all parts of wallpaper to obtain the target behavior wallpaper.

In a possible implementation, the behavior wallpaper unlocking apparatus 70 further includes a receiving module and a display module. The receiving module is configured to: after the unlocking module 72 unlocks the target behavior wallpaper based on the K target results sent by the K second electronic devices, receive a first input by the user for the target behavior wallpaper. The display module is configured to display at least one device identifier in response to the first input received by the receiving module, where each device identifier indicates one second electronic device in the at least one second electronic device. The receiving module is further configured to receive a second input by the user, where the second input is an input by the user for a target device identifier in the at least one device identifier. The sending module 71 is further configured to send, in response to the second input received by the receiving module, the target behavior wallpaper to a second electronic device indicated by the target device identifier.

In a possible implementation, the sending module 71 is further configured to: after the applying module 73 applies the target behavior wallpaper to the first electronic device, send the target behavior wallpaper to a target user in a case that it is detected that current system time is specific time and the target behavior wallpaper is a specific type of wallpaper, where the target user is a user associated with a user to whom the first electronic device belongs.

The behavior wallpaper unlocking apparatus in this embodiment of this application can be an apparatus, or a component, an integrated circuit, or a chip in an electronic device. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not limited in this embodiment of this application.

The behavior wallpaper unlocking apparatus in this embodiment of this application may be an apparatus with an operating system. The operating system may be an Android operating system, may be an iOS operating system, or may be another possible operating system. This is not limited in this embodiment of this application.

The behavior wallpaper unlocking apparatus provided in this embodiment of this application can implement the processes implemented by the first electronic device in the foregoing method embodiments, and a same technical effect can be achieved. To avoid repetition, details are not described herein again.

FIG. 5 is a schematic diagram of another possible structure of a behavior wallpaper unlocking apparatus according to an embodiment of this application. As shown in FIG. 5, the behavior wallpaper unlocking apparatus 80 may include a receiving module 81, an execution module 82, and a sending module 83.

The receiving module 81 is configured to receive a first message sent by a first electronic device, where the first message is used to request a second electronic device to unlock a target behavior wallpaper, the first message includes K task items, and each task item is corresponding to a part of wallpaper in the target behavior wallpaper. The execution module 82 is configured to execute at least one task item in the K task items to obtain at least one target result, where each target result is a result of one task item executed by the second electronic device. The sending module 83 is configured to send, to the first electronic device, the at least one target result obtained by the execution module 82, where the at least one target result is used by the first electronic device to unlock the target behavior wallpaper.

This embodiment of this application provides a behavior wallpaper unlocking apparatus. On one hand, because a user of the second electronic device unlocks the target behavior wallpaper in the first electronic device together, interaction, the sense of accompany, and interest of using the behavior wallpaper by the user are increased. On the other hand, because a plurality of users jointly participate in a process of unlocking the target behavior wallpaper, the target behavior wallpaper may be quickly unlocked based on one or more target results sent by each second electronic device, thereby shortening time of unlocking the target behavior wallpaper, and avoiding a problem that a period of unlocking the target behavior wallpaper by a single electronic device is relatively long. In this way, efficiency and flexibility of unlocking the target behavior wallpaper are improved.

In a possible implementation, the sending module 83 is further configured to: before the execution module 82 executes the at least one task item in the K task items to obtain the at least one target result, send a second message to the first electronic device, where the second message is used to indicate a to-be-executed task item selected by the second electronic device. The receiving module 81 is further configured to receive a third message sent by the first electronic device, where the third message is sent by the first electronic device in a case that all N received second messages indicate a first task item, the third message is used to indicate that the second electronic device is allowed to execute the first task item, the second electronic device is a device corresponding to a message that is in the N second messages and that is sent at the earliest time, and N is an integer greater than 1, or the second electronic device is a device corresponding to a message selected from the N second messages by a user to whom the first electronic device belongs.

In a possible implementation, a quantity of the at least one second electronic device is greater than a quantity of the K task items. The sending module 83 is further configured to: before the execution module 82 executes the at least one task item in the K task items to obtain the at least one target result, send a fourth message to the first electronic device, where the fourth message is used to indicate a to-be-executed task item selected by the second electronic device. The receiving module 81 is further configured to receive a fifth message sent by the first electronic device, where the fifth message is used to indicate that the second electronic device is allowed to execute the selected task item, the second electronic device is a device corresponding to first P received messages in at least one fourth message received by the first electronic device, and P is a positive integer.

In a possible implementation, the behavior wallpaper unlocking apparatus 80 further includes an applying module. The receiving module 81 is further configured to: after the sending module 83 sends the at least one target result to the first electronic device, receive the target behavior wallpaper sent by the first electronic device. The applying module is configured to apply the target behavior wallpaper received by the receiving module 81 to the second electronic device.

The behavior wallpaper unlocking apparatus in this embodiment of this application can be an apparatus, or a component, an integrated circuit, or a chip in an electronic device. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not limited in this embodiment of this application.

The behavior wallpaper unlocking apparatus in this embodiment of this application may be an apparatus with an operating system. The operating system may be an Android operating system, may be an iOS operating system, or may be another possible operating system. This is not limited in this embodiment of this application.

The behavior wallpaper unlocking apparatus provided in this embodiment of this application can implement the processes implemented by the second electronic device in the foregoing method embodiments, and a same technical effect can be achieved. To avoid repetition, details are not described herein again.

Figure 6:
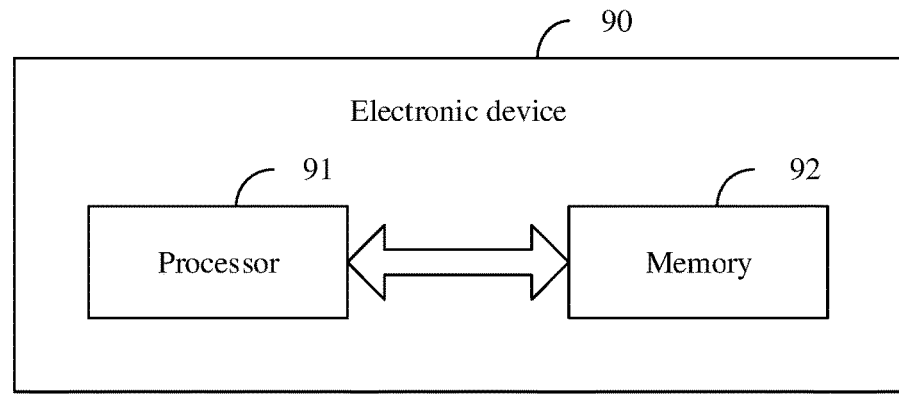
FIG. 6 is a first schematic diagram of a hardware structure of an electronic device according to an embodiment of this application.

Optionally, as shown in FIG. 6, an embodiment of this application further provides an electronic device 90, including a processor 91, a memory 92, and a program or an instruction stored in the memory 92 and executable on the processor 91. When the program or the instruction is executed by the processor 91, the processes of Embodiment 1 of the behavior wallpaper unlocking method are implemented, or the processes of Embodiment 2 of the behavior wallpaper unlocking method are implemented, and a same technical effect can be achieved. To avoid repetition, details are not described herein again.

It should be noted that the electronic device in this embodiment of this application includes the mobile electronic device and the non-mobile electronic device.

Figure 7:
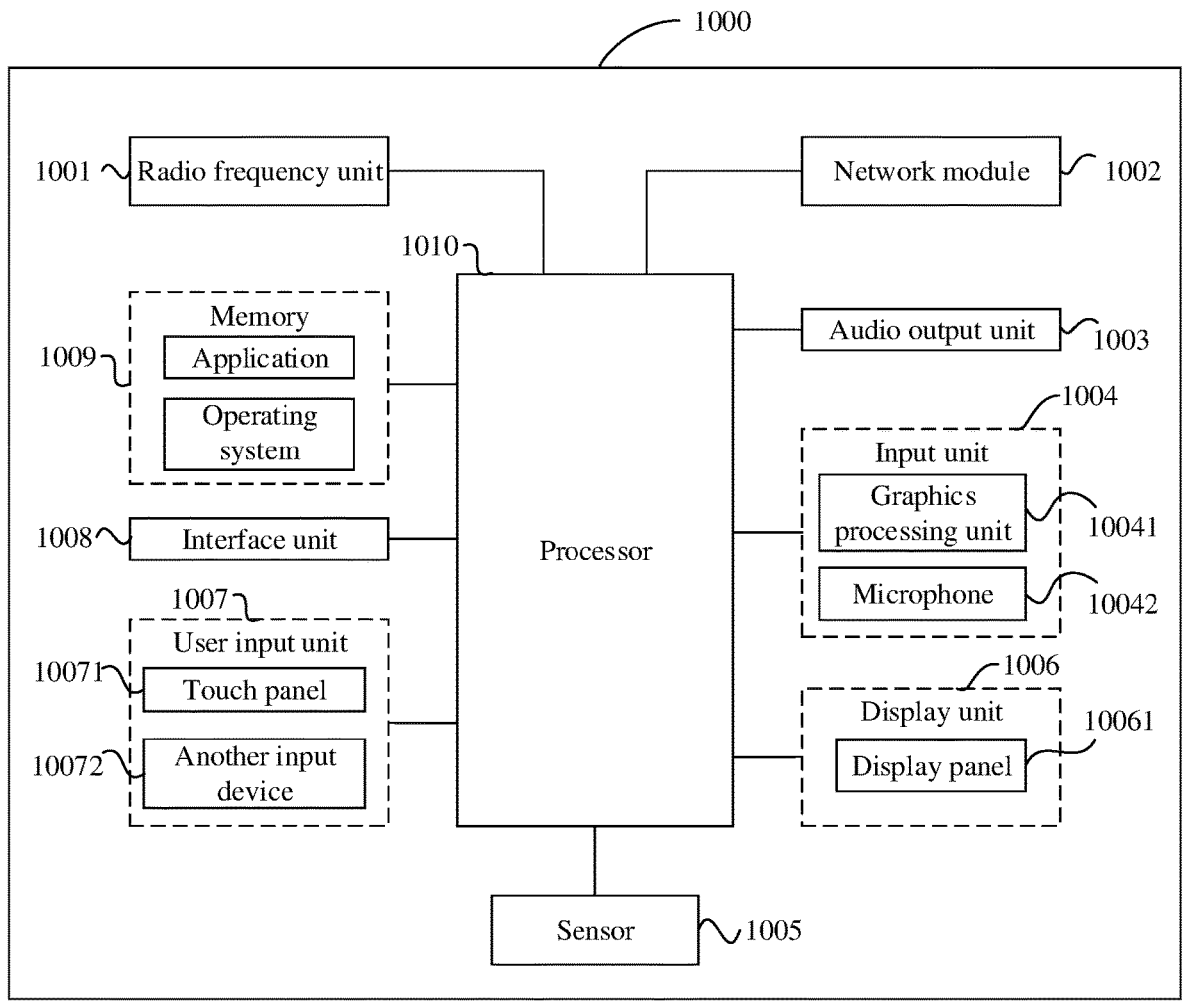
FIG. 7 is a second schematic diagram of a hardware structure of an electronic device according to an embodiment of this application.

FIG. 7 is a schematic diagram of a hardware structure of an electronic device according to an embodiment of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Those skilled in the art can understand that the electronic device 1000 may further include a power supply (for example, a battery) that supplies power to each component. The power supply may be logically connected to the processor 1010 by using a power management system, to implement functions such as charging and discharging management and power consumption management by using the power management system. The structure of the electronic device shown in FIG. 7 does not constitute a limitation on the electronic device. The electronic device may include more or fewer components than those shown in the figure, combine some components, or have different component arrangements. Details are not described herein.

Optionally, the electronic device 1000 is a first electronic device, and the radio frequency unit 1001 is configured to send a first message to the at least one second electronic device, where the first message is used to request the at least one second electronic device to unlock a target behavior wallpaper, the first message includes K task items, and each task item is corresponding to a part of wallpaper in the target behavior wallpaper. The processor 1010 is configured to: unlock the target behavior wallpaper based on K target results sent by M second electronic devices, and apply the target behavior wallpaper to the first electronic device, where the M second electronic devices are devices in the at least one second electronic device, each target result is a result of one task item executed by one second electronic device in the M second electronic devices, K and M are positive integers, and M is less than or equal to K.

This embodiment of this application provides an electronic device. On one hand, the first electronic device may send a request to the at least one second electronic device, so that a user of the first electronic device can unlock the target behavior wallpaper in the first electronic device together with another user, thereby increasing interaction, the sense of accompany, and interest of using the behavior wallpaper by the user. On the other hand, because a plurality of users jointly participate in a process of unlocking the target behavior wallpaper, the first electronic device may quickly unlock the target behavior wallpaper based on one or more target results sent by each second electronic device, thereby shortening time of unlocking the target behavior wallpaper by the first electronic device, and avoiding a problem that a period of unlocking the target behavior wallpaper by a single electronic device is relatively long. In this way, efficiency and flexibility of unlocking the target behavior wallpaper by the electronic device are improved.

Optionally, in this embodiment of this application, the radio frequency unit 1001 is further configured to: before the target behavior wallpaper is unlocked based on the M target results sent by the K second electronic devices, receive at least one second message sent by the at least one second electronic device, where each second message is used to indicate a to-be-executed task item selected by one second electronic device in the at least one second electronic device. The radio frequency unit 1001 is further configured to: in a case that all N second messages in the at least one second message indicate a first task item, send a third message to N second electronic devices corresponding to the N second messages, where the third message is used to indicate that a target electronic device in the N second electronic devices is allowed to execute the first task item, the target electronic device is a device corresponding to a message that is in the N second messages and that is received at the earliest time, and N is an integer greater than 1, or the target electronic device is a device corresponding to a message selected from the N second messages by a user to whom the first electronic device belongs. The M second electronic devices include another electronic device and the target electronic device, and the another electronic device is a device in the at least one second electronic device other than the N second electronic devices.

Optionally, in this embodiment of this application, a quantity of the at least one second electronic device is greater than a quantity of the K task items. The radio frequency unit 1001 is further configured to: before the target behavior wallpaper is unlocked based on the K target results sent by the M second electronic devices, receive at least one fourth message sent by the at least one second electronic device, where each fourth message is used to indicate a to-be-executed task item selected by one second electronic device in the at least one second electronic device. The radio frequency unit 1001 is further configured to separately send a fifth message to P second electronic devices in the at least one second electronic device, where the fifth message is used to indicate that the P second electronic devices are allowed to execute selected task items, the P second electronic devices are devices corresponding to first P received messages in the at least one fourth message, and P is a positive integer. The M second electronic devices are the P second electronic devices.

Optionally, in this embodiment of this application, the processor 1010 is configured to: unlock a part of wallpaper corresponding to a target task item in the target behavior wallpaper for a target result sent by each second electronic device in the M second electronic devices, where the target task item is a task item corresponding to a target result sent by one second electronic device in the M second electronic devices; and after all parts of wallpaper corresponding to the K target results are unlocked, synthesize all parts of wallpaper to obtain the target behavior wallpaper.

Optionally, in this embodiment of this application, the user input unit 1007 is further configured to: after the target behavior wallpaper is unlocked based on the K target results sent by the K second electronic devices, receive a first input by the user for the target behavior wallpaper. The display unit 1006 is configured to display at least one device identifier in response to the first input, where each device identifier indicates one second electronic device in the at least one second electronic device. The user input unit 1007 is further configured to receive a second input by the user, where the second input is an input by the user for a target device identifier in the at least one device identifier. The radio frequency unit 1001 is further configured to send, in response to the second input, the target behavior wallpaper to a second electronic device indicated by the target device identifier.

Optionally, in this embodiment of this application, the radio frequency unit 1001 is further configured to: after the target behavior wallpaper is applied to the first electronic device, send the target behavior wallpaper to a target user in a case that it is detected that current system time is specific time and the target behavior wallpaper is a specific type of wallpaper, where the target user is a user associated with a user to whom the first electronic device belongs.

The electronic device provided in this embodiment of this application can implement the processes implemented by the first electronic device in the foregoing method embodiments. To avoid repetition, details are not described herein again.

For beneficial effects of various implementations in this embodiment, refer to the beneficial effects of the foregoing method Embodiment 1. To avoid repetition, details are not described herein again.

Optionally, the electronic device 1000 is a second electronic device, and the radio frequency unit 1001 is configured to receive a first message sent by a first electronic device, where the first message is used to request the second electronic device to unlock a target behavior wallpaper, the first message includes K task items, and each task item is corresponding to a part of wallpaper in the target behavior wallpaper. The processor 1010 is configured to execute at least one task item in the K task items to obtain at least one target result, where each target result is a result of one task item executed by the second electronic device. The radio frequency unit 1001 is further configured to send at least one target result to the first electronic device, where the at least one target result is used by the first electronic device to unlock the target behavior wallpaper.

This embodiment of this application provides an electronic device. On one hand, a user of the first electronic device and a user of the second electronic device may jointly unlock the target behavior wallpaper in the first electronic device, thereby increasing interaction, the sense of accompany, and interest of using the behavior wallpaper by the user. On the other hand, because a plurality of users jointly participate in a process of unlocking the target behavior wallpaper, the first electronic device may quickly unlock the target behavior wallpaper based on one or more target results sent by each second electronic device, thereby shortening time of unlocking the target behavior wallpaper by the first electronic device, and avoiding a problem that a period of unlocking the target behavior wallpaper by the electronic device is relatively long. In this way, efficiency and flexibility of unlocking the target behavior wallpaper by the electronic device are improved.

Optionally, in this embodiment of this application, the radio frequency unit 1001 is further configured to: before the at least one task item in the K task items is executed to obtain the at least one target result, send a second message to the first electronic device, where the second message is used to indicate a to-be-executed task item selected by the second electronic device. The radio frequency unit 1001 is further configured to receive a third message sent by the first electronic device, where the third message is sent by the first electronic device in a case that all N received second messages indicate a first task item, the third message is used to indicate that the second electronic device is allowed to execute the first task item, the second electronic device is a device corresponding to a message that is in the N second messages and that is sent at the earliest time, and N is an integer greater than 1, or the second electronic device is a device corresponding to a message selected from the N second messages by a user to whom the first electronic device belongs.

Optionally, in this embodiment of this application, a quantity of the at least one second electronic device is greater than a quantity of the K task items. The radio frequency unit 1001 is further configured to: before the at least one task item in the K task items is executed to obtain the at least one target result, send a fourth message to the first electronic device, where the fourth message is used to indicate a to-be-executed task item selected by the second electronic device. The radio frequency unit 1001 is further configured to receive a fifth message sent by the first electronic device, where the fifth message is used to indicate that the second electronic device is allowed to execute the selected task item, and the second electronic device is a device corresponding to first P received messages in the at least one fourth message received by the first electronic device, where P is a positive integer.

Optionally, in this embodiment of this application, the radio frequency unit 1001 is further configured to: after the at least one target result is sent to the first electronic device, receive the target behavior wallpaper sent by the first electronic device. The processor 1010 is further configured to apply the target behavior wallpaper to the second electronic device.

The electronic device provided in this embodiment of this application can implement the processes implemented by the second electronic device in the foregoing method embodiments. To avoid repetition, details are not described herein again.

For beneficial effects of various implementations in this embodiment, refer to the beneficial effects of the foregoing method Embodiment 2. To avoid repetition, details are not described herein again.

It should be understood that, in this embodiment of this application, the input unit 1004 may include a graphics processing unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. The display panel 10061 may be configured in a form such as a liquid crystal display or an organic light-emitting diode. The user input unit 1007 includes a touch panel 10071 and another input device 10072, and the touch panel 10071 is also referred to as a touchscreen. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. An application processor and a modem processor may be integrated into the processor 1010, the application processor mainly processes an operating system, a user interface, an application program, and the like, and the modem processor mainly processes wireless communication. It can be understood that, alternatively, the modem processor may not be integrated into the processor 1010.

An embodiment of this application further provides a non-transitory readable storage medium. The non-transitory readable storage medium stores a program or an instruction, and when the program or the instruction is executed by a processor, the processes of Embodiment 1 of the foregoing behavior wallpaper unlocking method are implemented, or the processes of Embodiment 2 of the foregoing behavior wallpaper unlocking method are implemented, and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes of Embodiment 1 of the foregoing behavior wallpaper unlocking method or the processes of Embodiment 2 of the foregoing behavior wallpaper unlocking method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the foregoing implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A behavior wallpaper unlocking method, performed by a first electronic device, wherein the method comprises:

sending a first message to at least one second electronic device, wherein the first message is used to request the at least one second electronic device to unlock a target behavior wallpaper, the first message comprises K task items, and each task item is corresponding to a part of wallpaper in the target behavior wallpaper; and unlocking the target behavior wallpaper based on K target results sent by M second electronic devices, and applying the target behavior wallpaper to the first electronic device, wherein the M second electronic devices are devices in the at least one second electronic device, each target result is a result of one task item executed by one second electronic device in the M second electronic devices, K and M are positive integers, and M is less than or equal to K;

wherein the unlocking the target behavior wallpaper based on K target results sent by M second electronic devices comprises:

unlocking, for a target result sent by each second electronic device in the M second electronic devices, a part of wallpaper corresponding to a target task item in the target behavior wallpaper, wherein the target task item is a task item corresponding to a target result sent by one second electronic device in the M second electronic devices; and after all parts of wallpaper corresponding to the K target results are unlocked, synthesizing all the parts of wallpaper to obtain the target behavior wallpaper.

2. The method according to claim 1, wherein the first message further comprises at least one of the following: deadline time of each task item in the K task items, a preview effect of the target behavior wallpaper, or indication information, and the indication information is used to indicate related content of the target behavior wallpaper to be sent by the first electronic device after the target behavior wallpaper is unlocked.

3. The method according to claim 1, wherein before the unlocking the target behavior wallpaper based on K target results sent by M second electronic devices, the method further comprises:

receiving at least one second message sent by the at least one second electronic device, wherein each second message is used to indicate a to-be-executed task item selected by one second electronic device in the at least one second electronic device; and in a case that all N second messages in the at least one second message indicate a first task item, sending a third message to N second electronic devices corresponding to the N second messages, wherein the third message is used to indicate that a target electronic device in the N second electronic devices is allowed to execute the first task item, the target electronic device is a device corresponding to a message that is in the N second messages and that is received at the earliest time, and N is an integer greater than 1, or the target electronic device is a device corresponding to a message selected from the N second messages by a user to whom the first electronic device belongs; wherein the M second electronic devices comprise another electronic device and the target electronic device, and the another electronic device is a device in the at least one second electronic device other than the N second electronic devices.

4. The method according to claim 1, wherein a quantity of the at least one second electronic device is greater than a quantity of the K task items; and before the unlocking the target behavior wallpaper based on K target results sent by M second electronic devices, the method further comprises:

receiving at least one fourth message sent by the at least one second electronic device, wherein each fourth message is used to indicate a to-be-executed task item selected by one second electronic device in the at least one second electronic device; and separately sending a fifth message to P second electronic devices in the at least one second electronic device, wherein the fifth message is used to indicate that the P second electronic devices are allowed to execute selected task items, the P second electronic devices are devices corresponding to first P received messages in the at least one fourth message, P is a positive integer, and the M second electronic devices are the P second electronic devices.

5. The method according to claim 1, wherein after the unlocking the target behavior wallpaper based on K target results sent by M second electronic devices, the method further comprises:

receiving a first input by a user for the target behavior wallpaper;

displaying at least one device identifier in response to the first input, wherein each device identifier indicates one second electronic device in the at least one second electronic device;

receiving a second input by the user, wherein the second input is an input by the user for a target device identifier in the at least one device identifier; and sending, in response to the second input, the target behavior wallpaper to a second electronic device indicated by the target device identifier.

6. The method according to claim 1, wherein the target behavior wallpaper comprises a wallpaper with at least two faces or a wallpaper with at least two dimensions; or the target behavior wallpaper comprises at least two task objects or at least two task nodes; or the target behavior wallpaper comprises at least two parts of wallpaper.

7. The method according to claim 1, wherein after the applying the target behavior wallpaper to the first electronic device, the method further comprises:

sending the target behavior wallpaper to a target user in a case that it is detected that current system time is specific time and the target behavior wallpaper is a specific type of wallpaper, wherein the target user is a user associated with a user to whom the first electronic device belongs.

8. A non-transitory readable storage medium, wherein the non-transitory readable storage medium stores a program or an instruction, and when the program or the instruction is executed by a processor, steps of the behavior wallpaper unlocking method according to claim 1 are implemented.

9. A behavior wallpaper unlocking method, performed by a second electronic device, wherein the method comprises:

receiving a first message sent by a first electronic device, wherein the first message is used to request the second electronic device to unlock a target behavior wallpaper, the first message comprises K task items, and each task item is corresponding to a part of wallpaper in the target behavior wallpaper;

executing at least one task item in the K task items to obtain at least one target result, wherein each target result is a result of one task item executed by the second electronic device; and sending the at least one target result to the first electronic device, wherein the at least one target result is used by the first electronic device to unlock the target behavior wallpaper;

wherein each part of wallpaper in the target behavior wallpaper is unlocked through a target result corresponding to the each part of wallpaper in K target results sent by M second electronic devices, and the target behavior wallpaper is obtained by the first electronic device through synthesizing all parts of wallpaper after all the parts of wallpaper corresponding to the K target results are unlocked, wherein the K target results comprise the at least one target result, the M second electronic devices comprise the second electronic device, K and M are positive integers, and M is less than or equal to K.

10. The method according to claim 9, wherein before the executing at least one task item in the K task items to obtain at least one target result, the method further comprises:

sending a second message to the first electronic device, wherein the second message is used to indicate a to-be-executed task item selected by the second electronic device; and receiving a third message sent by the first electronic device, wherein the third message is sent by the first electronic device in a case that all N received second messages indicate a first task item, the third message is used to indicate that the second electronic device is allowed to execute the first task item, the second electronic device is a device corresponding to a message that is in the N second messages and that is sent at the earliest time, and N is an integer greater than 1, or the second electronic device is a device corresponding to a message selected from the N second messages by a user to whom the first electronic device belongs.

11. The method according to claim 9, wherein a quantity of at least one second electronic device is greater than a quantity of the K task items; and before the executing at least one task item in the K task items to obtain at least one target result, the method further comprises:

sending a fourth message to the first electronic device, wherein the fourth message is used to indicate a to-be-executed task item selected by the second electronic device; and receiving a fifth message sent by the first electronic device, wherein the fifth message is used to indicate that the second electronic device is allowed to execute the selected task item, the second electronic device is a device corresponding to first P received messages in at least one fourth message received by the first electronic device, and P is a positive integer.

12. The method according to claim 9, wherein after the sending the at least one target result to the first electronic device, the method further comprises:

receiving the target behavior wallpaper sent by the first electronic device, and applying the target behavior wallpaper to the second electronic device.

13. An electronic device, comprising a processor, a memory, and a program or an instruction stored in the memory and executable on the processor, wherein when the program or the instruction is executed by the processor, steps of the behavior wallpaper unlocking method according to claim 9 are implemented.

14. A non-transitory readable storage medium, wherein the non-transitory readable storage medium stores a program or an instruction, and when the program or the instruction is executed by a processor, steps of the behavior wallpaper unlocking method according to claim 9 are implemented.

15. An electronic device, being a first electronic device and comprising a processor, a memory, and a program or an instruction stored in the memory and executable on the processor, wherein the program or the instruction, when executed by the processor, causes the first electronic device to perform:

sending a first message to at least one second electronic device, wherein the first message is used to request the at least one second electronic device to unlock a target behavior wallpaper, the first message comprises K task items, and each task item is corresponding to a part of wallpaper in the target behavior wallpaper; and unlocking the target behavior wallpaper based on K target results sent by M second electronic devices, and applying the target behavior wallpaper to the first electronic device, wherein the M second electronic devices are devices in the at least one second electronic device, each target result is a result of one task item executed by one second electronic device in the M second electronic devices, K and M are positive integers, and M is less than or equal to K;

wherein the program or the instruction, when executed by the processor, causes the first electronic device to perform:

unlocking, for a target result sent by each second electronic device in the M second electronic devices, a part of wallpaper corresponding to a target task item in the target behavior wallpaper, wherein the target task item is a task item corresponding to a target result sent by one second electronic device in the M second electronic devices; and after all parts of wallpaper corresponding to the K target results are unlocked, synthesizing all the parts of wallpaper to obtain the target behavior wallpaper.

16. The electronic device according to claim 15, wherein the first message further comprises at least one of the following: deadline time of each task item in the K task items, a preview effect of the target behavior wallpaper, or indication information, and the indication information is used to indicate related content of the target behavior wallpaper to be sent by the first electronic device after the target behavior wallpaper is unlocked.

17. The electronic device according to claim 15, wherein the program or the instruction, when executed by the processor, causes the first electronic device to further perform:

receiving at least one second message sent by the at least one second electronic device, wherein each second message is used to indicate a to-be-executed task item selected by one second electronic device in the at least one second electronic device; and in a case that all N second messages in the at least one second message indicate a first task item, sending a third message to N second electronic devices corresponding to the N second messages, wherein the third message is used to indicate that a target electronic device in the N second electronic devices is allowed to execute the first task item, the target electronic device is a device corresponding to a message that is in the N second messages and that is received at the earliest time, and N is an integer greater than 1, or the target electronic device is a device corresponding to a message selected from the N second messages by a user to whom the first electronic device belongs; wherein the M second electronic devices comprise another electronic device and the target electronic device, and the another electronic device is a device in the at least one second electronic device other than the N second electronic devices.

18. The electronic device according to claim 15, wherein a quantity of the at least one second electronic device is greater than a quantity of the K task items; and the program or the instruction, when executed by the processor, causes the first electronic device to further perform:

receiving at least one fourth message sent by the at least one second electronic device, wherein each fourth message is used to indicate a to-be-executed task item selected by one second electronic device in the at least one second electronic device; and separately sending a fifth message to P second electronic devices in the at least one second electronic device, wherein the fifth message is used to indicate that the P second electronic devices are allowed to execute selected task items, the P second electronic devices are devices corresponding to first P received messages in the at least one fourth message, P is a positive integer, and the M second electronic devices are the P second electronic devices.

19. The electronic device according to claim 15, wherein the program or the instruction, when executed by the processor, causes the first electronic device to further perform:

receiving a first input by a user for the target behavior wallpaper;

displaying at least one device identifier in response to the first input, wherein each device identifier indicates one second electronic device in the at least one second electronic device;

receiving a second input by the user, wherein the second input is an input by the user for a target device identifier in the at least one device identifier; and sending, in response to the second input, the target behavior wallpaper to a second electronic device indicated by the target device identifier.

20. The electronic device according to claim 15, wherein the target behavior wallpaper comprises a wallpaper with at least two faces or a wallpaper with at least two dimensions; or the target behavior wallpaper comprises at least two task objects or at least two task nodes; or the target behavior wallpaper comprises at least two parts of wallpaper.

* * * * *